(12) United States Patent
Schiffmann et al.

(10) Patent No.: US 9,577,564 B2
(45) Date of Patent: Feb. 21, 2017

(54) DRIVE SYSTEM WITH ENERGY STORE AND METHOD FOR OPERATING A DRIVE SYSTEM

(71) Applicant: SEW-EURODRIVE GMBH & CO. KG, Bruchsal (DE)

(72) Inventors: Sebastian Schiffmann, Kronau (DE); Josef Schmidt, Graben-Neudorf (DE); Matthias Hauck, Schwetzingen (DE); Christian Lampert, Bruchsal (DE); Daniel Tritschler, Bruchsal (DE); Thomas Zöller, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 170 days.

(21) Appl. No.: 14/376,691

(22) PCT Filed: Jan. 28, 2013

(86) PCT No.: PCT/EP2013/000237
§ 371 (c)(1),
(2) Date: Aug. 5, 2014

(87) PCT Pub. No.: WO2013/117304
PCT Pub. Date: Aug. 15, 2013

(65) Prior Publication Data
US 2015/0028786 A1    Jan. 29, 2015

(30) Foreign Application Priority Data
Feb. 6, 2012   (DE) .................. 10 2012 002 089

(51) Int. Cl.
*H02P 1/00* (2006.01)
*H02P 3/00* (2006.01)
(Continued)

(52) U.S. Cl.
CPC .............. *H02P 27/06* (2013.01); *H02H 9/045* (2013.01); *H02J 7/345* (2013.01); *H02M 5/458* (2013.01); *H02P 2201/03* (2013.01)

(58) Field of Classification Search
CPC ............................... H02P 27/06; H02H 9/045
(Continued)

(56) References Cited

U.S. PATENT DOCUMENTS 5,734,258 A     3/1998 Esser
6,404,655 B1 *  6/2002 Welches ............ H02M 7/53875
                                                363/17
(Continued)

FOREIGN PATENT DOCUMENTS

DE         101 01 988 A    7/2002
DE     10 2005 042321 A1   3/2007
(Continued)

OTHER PUBLICATIONS

International Search Report in PCT/EP2013/000237 mailed May 6, 2014 [English Translation].
(Continued)

*Primary Examiner* — Erick Glass
(74) *Attorney, Agent, or Firm* — Andrews Kurth Kenyon LLP

(57) ABSTRACT

A drive system with energy store and method for operating a drive system, an inverter powering an electric motor, the inverter being supplied from a unipolar DC-link voltage, an energy store being connected in parallel to the inverter, in particular, a film capacitor being connected in parallel to the inverter, the DC-link voltage being generated by a DC/DC converter which is supplied from an AC/DC converter, especially a rectifier, in particular, an electric current being able to be supplied to the DC link by the DC/DC converter.

26 Claims, 1 Drawing Sheet

(51) Int. Cl.
    *H02P 7/06*     (2006.01)
    *H02P 27/06*     (2006.01)
    *H02M 5/458*     (2006.01)
    *H02J 7/34*     (2006.01)
    *H02H 9/04*     (2006.01)

(58) Field of Classification Search
    USPC .......................................................... 318/494
    See application file for complete search history.

(56) References Cited

U.S. PATENT DOCUMENTS

| | | |
|---|---|---|
| 2010/0308584 A1 | 12/2010 | Coates et al. |
| 2013/0106328 A1* | 5/2013 | Kopiness ................ H02M 1/36 |
| | | 318/400.11 |
| 2013/0271077 A1* | 10/2013 | Kim .................... B60L 11/1811 |
| | | 320/109 |

FOREIGN PATENT DOCUMENTS

| | | |
|---|---|---|
| DE | 10 2007 010 998 | 9/2007 |
| DE | 10 2009 031257 A1 | 1/2011 |

OTHER PUBLICATIONS

International Preliminary Report on Patentability, mailed Aug. 21, 2014, issued in corresponding International Application No. PCT/EP2013/000237.

\* cited by examiner

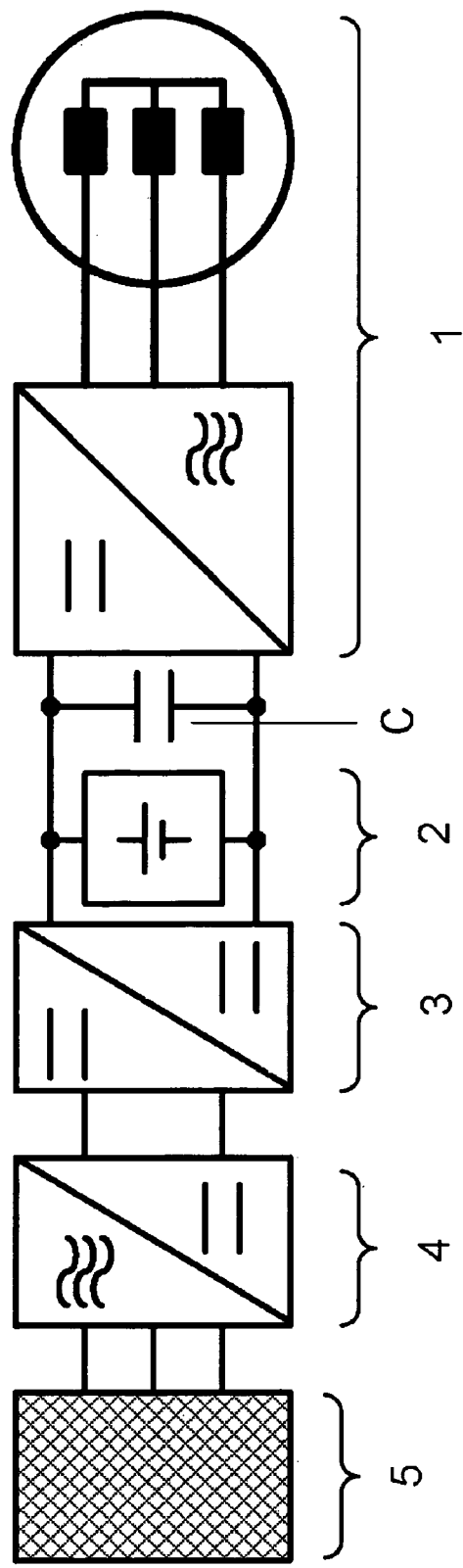

US 9,577,564 B2

DRIVE SYSTEM WITH ENERGY STORE AND METHOD FOR OPERATING A DRIVE SYSTEM

FIELD OF THE INVENTION

The present invention relates to a drive system having an energy store and a method for operating a drive system.

BACKGROUND INFORMATION

It is generally known that a drive system is made up of an electric motor powered by an inverter, the inverter being supplied from a rectifier-fed DC link. A capacitor buffers the DC-link voltage.

Inverters and inverter-fed devices in this document are also understood to be power converters or devices fed by power converters.

SUMMARY

Therefore, an object of the present invention is to reduce energy consumption of a drive system.

The features of the invention with regard to the drive system having an energy store are that an inverter powers an electric motor, the inverter being supplied from a unipolar DC-link voltage, an energy store being connected in parallel to the inverter, in particular, a film capacitor being connected in parallel to the inverter, the DC-link voltage being generated by a DC/DC converter, which is supplied from an AC/DC converter, especially a rectifier, in particular, an electric current being able to be supplied to the DC link by the DC/DC converter.

An energy store is thus connected in parallel to the DC link.

The advantage in this context is that the drive is operable after the manner of a voltage-commutated DC-link converter and/or a self-commutated converter having an intermediate voltage circuit. It is further advantageous that the energy flow needed from the rectifier is controllable, and therefore the power is able to be limited to a limiting value, especially a limiting value as a function of the state of the drive. In addition, a film capacitor may be used in the DC link, so that high-frequency currents are able to be buffered.

A further advantage of the present invention is that the energy consumption, the system reaction and the connected load are reduced. It is even possible to dispense with a regenerative feedback unit and/or a braking resistor disposed in the DC link, since too high a DC-link voltage is able to be brought about during normal operation by the energy store.

In one advantageous development, the rectifier is fed from a single-phase, three-phase or multiphase AC source or from a secondary winding that is coupled inductively to a primary conductor which, in particular, is acted upon by an alternating current. The advantage in this instance is that the energy supplied by the DC/DC converter to the DC link comes from an AC system, thus a permanently installed system, or from an inductive transmission. Thus, the drive system may also be disposed on a moving part of an installation if a primary conductor is laid in stationary manner in the installation.

In one advantageous refinement, the energy store has at least one double-layer capacitor and/or at least one accumulator. This is advantageous because high energy capacity is able to be provided in the DC link.

In one advantageous development, a means for detecting the DC-link voltage is connected to a means of comparison, the means of comparison being connected to the DC/DC converter, especially so that the DC/DC converter controls such a current in the DC link that the power fed into the DC link is regulated to a setpoint value, in particular, the means of comparison comparing the detected DC-link voltage to at least one critical value (U0, U1 and/or U2). The advantage in this context is that a current is able to be fed into the DC link as a function of voltage.

In one advantageous refinement, a series circuit made up of a switch and a resistor is connected in parallel to the inverter, the DC link and/or the energy store. The advantage in this instance is that in response to critically high voltage in the DC link, thus, in the event the second value is exceeded, it is possible to remove energy from the DC link.

In one advantageous development, the setpoint value is predefined by a primary control, in particular, the control determining the setpoint value predictively from the planned control sequence. This is advantageous because the setpoint value is adjustable to the respective states or sequences.

In one advantageous refinement, the power able to be fed by the DC/DC converter into the DC link is limited to a limiting value, in particular, the limiting value being greater than the power of the drive, especially the power of the drive averaged over time, and/or the limiting value being less than the peak power of the drive, in particular, the power being a function of the operating state of the drive. This is advantageous because energy is used as economically as possible.

Important features with regard to the method are that it is used to operate a drive system, the inverter of a drive being fed from a DC link which is able to be fed by a DC/DC converter that is able to be supplied from an AC/DC converter, especially a rectifier, the inverter of the drive being connected to a control, which is connected, especially directly or indirectly, to the DC/DC converter and the inverter for transmitting signals, so that the DC/DC converter supplies the electric power, predetermined by the control, to the DC link.

The advantage in this context is that a specifiable power is able to be supplied by the DC/DC converter to the DC link.

In one advantageous development, the DC-link voltage is detected, and if there is a drop below a first value, an electric power is fed by the DC/DC converter into the DC link. This is advantageous because the infeed into the DC link is able to be carried out as a function of the voltage there.

In one advantageous refinement, the DC-link voltage is detected, and in the event a second value is exceeded, energy from the DC link is fed to a resistor for conversion into ohmic heat, or to a regenerative feedback unit for the recovery of energy into an AC system. This offers the advantage that safety is increased, because no critically high voltage values are attainable. However, a regenerative feedback unit is not necessary if the energy store is suitably dimensioned.

In one advantageous refinement, the second value is greater than the first value. This offers the advantage that a simple implementation is feasible.

In one advantageous development, the DC-link voltage is detected, and if there is a drop below the second value and the first value is exceeded, no electric power is fed by the DC/DC converter into the DC link. The advantage in this instance is that energy may be saved.

In one advantageous development, a hysteresis is taken into account in comparing the detected DC-link voltage to the first and/or second value. The advantage in so doing is that the hunting tendency is decreased.

In one advantageous refinement, the maximum permissible power able to be fed and/or fed by the DC/DC converter into the DC link is greater than the average power able to be drawn and/or drawn from the DC link by the drive, in particular is less than the peak power of the drive and/or greater than the average power of the drive, in particular, the energy store being dimensioned to be sufficiently large. This is advantageous because a minimum level of the DC-link voltage is ensured.

In one advantageous refinement, the control specifies to the DC/DC converter the value for the maximum permissible power able to be fed and/or fed by the DC/DC converter into the DC link, as a function of the state of the drive. The advantage in this instance is that it permits adjustment to a changing and/or instantaneous situation. In so doing, a primary control may be used advantageously, since it controls the sequence of movements.

BRIEF DESCRIPTION OF THE DRAWING

The FIGURE shows a schematic of a drive system according to the present invention.

DETAILED DESCRIPTION

As shown in the FIGURE, a drive 1 is provided which has an inverter, thus, a DC/AC converter, with electric motor energized from it.

The inverter of drive 1 is supplied with unipolar voltage from a DC link, a DC-link capacitor C being disposed in the DC link for the smoothing. Preferably, this DC-link capacitor is in the form of a film capacitor. The capacitance of the film capacitor is only so great that at maximum approved motor power of the drive, the amount of energy for an operation of less than one line period, e.g., 20 ms, is able to be stored in DC-link capacitor C.

In addition, an energy store 2 having a large capacitance and preferably formed of double-layer capacitors is disposed in the DC link. To protect the double-layer capacitors, a current-limiting means and possibly also a protection against polarity reversal and overvoltage protection are disposed in the energy store.

DC/DC converter 3 controls the flow of energy into the DC link from AC/DC converter, especially rectifier, 4, which supplies DC/DC converter 3 and which in turn is supplied from power supply system 5.

DC/DC converter 3 influences the voltage by feeding a corresponding electric power flow into the DC link. In addition, the DC-link voltage is influenced by the power flow drawn from the drive 1 in motor mode or supplied in generator mode.

Depending on the operating point of the drive system, the DC-link voltage is even higher than the voltage which would set in without DC/DC converter 3. The average DC-link voltage is freely selectable by the DC/DC converter within a large range. This is independent of the connection to power supply together with its voltage, phase number, frequency and/or quality.

The drive system is operable in various ways.

In a first variant, the setpoint power flow to be fed into the DC link is predefined to DC/DC converter 3 by a control, e.g., superordinate control and/or control driving the inverter. The control controls the sequence of movements over time, thus, the sequence of operating points of the drive 1, and is therefore also able to specify to DC/DC converter 3 a setpoint power flow ascertained from the prognosticated requirement. In the simplest case, the setpoint power flow is a constant value.

In a second variant, DC-link voltage U is detected and compared to a first critical value U1. So long as DC-link voltage U is less than U1, current delivered by power supply system 5 and rectified via the AC/DC converter is fed by DC/DC converter 3 to the DC link. In this context, the associated power is limited to a maximum permissible value P_crit.

As soon as DC-link voltage U is greater than U1, no power is supplied to the DC link by DC/DC converter 3.

As soon as DC-link voltage U is greater than a second critical value U2, with the aid of a resistor, especially a braking resistor, which is then switched in, a power current from the DC link is converted into a heat flow which is dissipated to the area surrounding the resistor. To that end, the resistor is thus able to be supplied from the DC link via a controllable switch.

In each instance, the power limit of DC/DC converter 3 is greater than the average driving power of the drive 1. The energy store must be adequately dimensioned.

Hystereses are preferably taken into account in the comparisons mentioned. Vacillations in the operating state are therefore able to be suppressed.

In a further exemplary embodiment of the present invention, instead of AC/DC converter 4 supplied from the power supply system, a single-phase rectifier is used which is supplied from a secondary winding that is coupled inductively to a primary conductor which is laid in elongated fashion or is implemented as a ring winding. Thus, energy is transmittable inductively from the primary conductor to the secondary winding. In this instance, the secondary winding supplies DC/DC converter 3, from which in turn drive 1 is supplied, an energy store 2 being used.

LIST OF REFERENCE NUMERALS

1 Drive, including inverter with electric motor fed from it
2 Energy store
3 DC/DC converter
4 AC/DC converter, especially rectifier
5 AC input power supply
C DC-link capacitor

What is claimed is:

1. A drive system, comprising:
   an energy store;
   an inverter powering an electric motor, wherein:
      the inverter is supplied from a unipolar DC-link voltage,
      the energy store is connected in parallel to the inverter, and
      the DC-link voltage is generated by a DC/DC converter that is supplied from an AC/DC converter; and
   an arrangement for detecting the DC-link voltage and connected to an arrangement of comparison, the arrangement of comparison being connected to the DC/DC converter.

2. The drive system as recited in claim 1, wherein the energy store includes a film capacitor connected in parallel to the inverter.

3. The drive system as recited in claim 1, wherein the AC/DC converter includes a rectifier.

4. The drive system as recited in claim 3, wherein the rectifier is fed from a single-phase, three-phase or multi-phase AC source or from a secondary winding that is coupled inductively to a primary conductor.

5. The drive system as recited in claim 1, wherein an electric current is able to be supplied to a DC link providing the DC-link voltage by the DC/DC converter.

6. The drive system as recited in claim 4, wherein the primary conductor is acted upon by an alternating current.

7. The drive system as recited in claim 1, wherein the energy store includes at least one of at least one double-layer capacitor and at least one accumulator.

8. The drive system as recited in claim 1, wherein the arrangement of comparison is connected to the DC/DC converter so that the DC/DC converter controls such a current in the DC link that a power fed into the DC link is regulated to a setpoint value.

9. The drive system as recited in claim 8, wherein the setpoint value corresponds to one of a power setpoint value and a voltage setpoint value.

10. The drive system as recited in claim 8, wherein the setpoint value is predefined by a primary control.

11. The drive system as recited in claim 10, wherein the primary control determines the setpoint value predictively from a planned control sequence.

12. The drive system as recited in claim 1, wherein the arrangement of comparison compares the detected DC-link voltage to at least one critical value.

13. A drive system, comprising:
an energy store;
an inverter powering an electric motor, wherein:
the inverter is supplied from a unipolar DC-link voltage,
the energy store is connected in parallel to the inverter, and
the DC-link voltage is generated by a DC/DC converter that is supplied from an AC/DC converter; and
a series circuit that includes a switch and a resistor, wherein the series circuit is connected in parallel to at least one of the DC link and the inverter.

14. A drive system, comprising:
an energy store;
an inverter powering an electric motor, wherein:
the inverter is supplied from a unipolar DC-link voltage,
the energy store is connected in parallel to the inverter, and
the DC-link voltage is generated by a DC/DC converter that is supplied from an AC/DC converter; and
a power able to be fed by the DC/DC converter into the DC link is limited to a limiting value, wherein at least one of:
the limiting value is greater than a power of the drive system, and
the limiting value is less than a peak power of the drive system.

15. The drive system as recited in claim 14, wherein the power of the drive system is averaged over time.

16. The drive system as recited in claim 14, wherein the power is a function of an operating state of the drive system.

17. A method for operating a drive system that includes an energy store, and an inverter powering an electric motor, the inverter being supplied from a unipolar DC-link voltage, the energy store being connected in parallel to the inverter, and the DC-link voltage being generated by a DC/DC converter that is supplied from an AC/DC converter, the method comprising:
feeding the inverter from a DC link that is able to be fed by the DC/DC converter, the DC/DC converter being able to be supplied from the AC/DC converter;
connecting the inverter to a control;
connecting the control, one of directly and indirectly, to the DC/DC converter and the inverter for transmitting signals so that the DC/DC converter supplies an electric power predefined by the control, to the DC link;
detecting the DC-link voltage; and
if a drop in the DC-link voltage is below a first value, feeding the electric power by the DC/DC converter into the DC link.

18. The method as recited in claim 17, wherein the AC/DC converter includes a rectifier.

19. The method as recited in claim 17, wherein if the DC-link voltage exceeds a second value, an energy from the DC link is supplied one of (1) to a resistor for conversion into ohmic heat, and (2) to a regenerative feedback unit for a recovery of energy into an AC system.

20. The method as recited in claim 19, wherein the second value is greater than the first value.

21. The method as recited in claim 20, further comprising:
taking into account a hysteresis in the comparison of the detected DC-link voltage to at least one of the first value and the second value.

22. The method as recited in claim 17, wherein the control specifies to the DC/DC converter a value for a maximum permissible power at least one of able to be fed and fed by the DC/DC converter into the DC link, as a function of a state of the drive system.

23. A method for operating a drive system that includes an energy store, and an inverter powering an electric motor, the inverter being supplied from a unipolar DC-link voltage, the energy store being connected in parallel to the inverter, and the DC-link voltage being generated by a DC/DC converter that is supplied from an AC/DC converter, the method comprising:
feeding the inverter from a DC link that is able to be fed by the DC/DC converter, the DC/DC converter being able to be supplied from the AC/DC converter;
connecting the inverter to a control;
connecting the control, one of directly and indirectly, to the DC/DC converter and the inverter for transmitting signals so that the DC/DC converter supplies an electric power predefined by the control, to the DC link;
detecting the DC-link voltage, wherein if the DC-link voltage drops below a second value and exceeds a first value, no electric power is fed by the DC/DC converter into the DC link.

24. The method as recited in claim 23, further comprising:
taking into account a hysteresis in the comparison of the detected DC-link voltage to at least one of the first value and the second value.

25. A method for operating a drive system that includes an energy store, and an inverter powering an electric motor, the inverter being supplied from a unipolar DC-link voltage, the energy store being connected in parallel to the inverter, and the DC-link voltage being generated by a DC/DC converter that is supplied from an AC/DC converter, the method comprising:
feeding the inverter from a DC link that is able to be fed by the DC/DC converter, the DC/DC converter being able to be supplied from the AC/DC converter;
connecting the inverter to a control; and
connecting the control, one of directly and indirectly, to the DC/DC converter and the inverter for transmitting signals so that the DC/DC converter supplies an electric power predefined by the control, to the DC link;

wherein at least one of:

a maximum permissible power at least one of able to be fed and fed by the DC/DC converter into the DC link is greater than an average power at least one of able to be drawn and drawn from the DC link by the drive system, and the maximum permissible power at least one of able to be fed and fed by the DC/DC converter into the DC link is less than a peak power.

26. The method as recited in claim 25, wherein the energy store is dimensioned to be sufficiently large.

* * * * *